United States Patent [19]

Okoshi et al.

[11] Patent Number: 4,533,716
[45] Date of Patent: Aug. 6, 1985

[54] COATING RESIN COMPOSITION

[75] Inventors: Noboru Okoshi, Chiba; Takenori Ikeda, Ichihara, both of Japan

[73] Assignee: Dainippon Ink and Chemicals, Inc., Tokyo, Japan

[21] Appl. No.: 637,539

[22] Filed: Aug. 3, 1984

[30] Foreign Application Priority Data

Aug. 5, 1983 [JP] Japan ................. 58-142491

[51] Int. Cl.³ ............................................ C08G 18/38
[52] U.S. Cl. ..................................... 528/73; 528/254; 528/903
[58] Field of Search ........................................... 528/73

[56] References Cited

U.S. PATENT DOCUMENTS

| | | | |
|---|---|---|---|
| 3,573,301 | 3/1971 | Winter | 528/73 |
| 3,624,035 | 11/1971 | von Portatius | 525/509 |
| 3,966,665 | 6/1976 | Sakata et al. | 525/509 |
| 4,314,923 | 2/1982 | Chang et al. | 525/509 |

*Primary Examiner*—Maurice J. Welsh

*Attorney, Agent, or Firm*—Wenderoth, Lind & Ponack

[57] ABSTRACT

A coating resin composition consisting essentially of
(A) a triazine-type resin obtained by co-condensing a triazine-type amino compound represented by the general formula

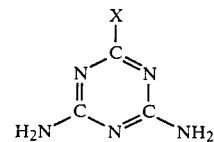

wherein X is hydrogen, methyl, ethyl, propyl, phenyl or amino, formaldehyde and a polyol and as required, a monohydric alcohol, and (B) a polyisocyanate, the solids weight ratio of (A) to (B) being from 5:95 to 95:5.

5 Claims, No Drawings

COATING RESIN COMPOSITION

This invention relates to a novel and useful coating resin composition. More specifically, this invention relates to a two-package curable urethane coating resin composition comprising a specific triazine-type resin and a polyisocyanate as essential components.

Two-package curable urethane paints have been widely used as corrosion-resistant paints and paints for woodworks and furniture and for automotive refinishing because they are fast-curing and generally give coated films having high hardness, excellent toughness and excellent durability. The vehicle component of such urethane paints is composed of a polyisocyanate as a curing agent component and a polyol component.

Alkyd resins or acrylic resins are frequently used as the polyol component, sometimes in combination with cellulose derivatives such as cellulose acetatebutyrate. In heavy duty coatings, various epoxy resins or modified epoxy resins are mainly used.

The alkyd resins are classified into oil-containing alkyd resins in the narrow sense and oil-free polyester resins which are chosen according to the intended applications. The former are used mainly as top coats for woodworks, furniture, bridges, ships, overland structures, and tanks. The latter are used mainly as wood sealers or sanding sealers for woodworks and furniture, for coating of automobile bumpers and leathers, or as textile printing binders.

The acrylic resins are composed of copolymers of hydroxyl-containing acrylic monomers, and have shown a striking demand in the field of automotive refinishing paints.

The alkyd resins have better application property, fullness and pigment dispersibility than the acrylic resins, but have the defect of poor drying property. In the field of paints for woodworks and furniture, it has been desired to develop a paint which has fast-drying property comparable to the alkyd resins and fullness comparable to the alkyd resins and unsaturated polyester resins.

On the other hand, in the field of automotive refinishing paints, it is desired to achieve higher solids contents of the acrylic resins and improve the dispersibility of pigments in the acrylic resins.

None of the conventional resins, however, can meet these properties at the same time.

With this background, the present inventors made extensive investigations in order to develop a resin which is fast-drying, has good gloss, fullness, pigment dispersibility and durability and excellent application property and can achieve high solids contents. These investigations have led to the discovery that a resin composed mainly of a triazine-type compound is a most suitable polyol as a raw material for polyurethanes.

Thus, according to this invention, there is provided a coating resin composition consisting essentially of (A) a triazine-type resin obtained by co-condensing a triazine-type amino compound represented by the general formula

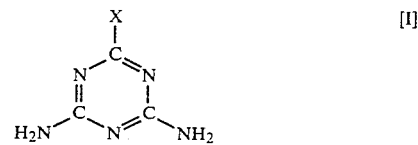

wherein X is hydrogen, methyl, ethyl, propyl, phenyl or amino, formaldehyde and a polyol and as required, a monohydric alcohol, and (B) a polyisocyanate, the solids weight ratio of (A) to (B) being from 5:95 to 95:5.

Typical Examples of the triazine-type amino compound represented by general formula [I] are melamine, benzoguanamine, acetoguanamine, formoguanamine, propioguanamine and isobutyroguanamine. These compounds may be used singly or in combination.

These guanamine compounds are generally synthesized from dicyandiamide and nitrile compounds as starting materials [see, for example, Nomura, Yoshida, Kakurai and Noguchi: "Journal of Synthetic Organic Chemistry, Japan", Vol. 24, No. 2, page 125 (1966)]. Hence, various guanamines having different substituents are obtained depending upon the kinds of the nitrile compounds.

It is well known that the triazine-type amino compounds react with formaldehyde to form methylolated compounds. The theoretical amount of formaldehdye to be reacted is determined by the number of amino groups in the amino compound. Since 2 moles of formaldehyde add to one amino group to form two methylol groups, if the number of the amino groups bonded to the triazine rings is n (for example, n=2 in guanamines, and n=3 in melamin), 2n moles at the largest of formaldehyde adds to the amino compound. In practice, the suitable amount of formaldehyde used is in the range of n to 20n moles per mole of the amino compound. If it is less than n moles, the reactivity of the reaction product with the polyhydric alcohol in the subsequent step is reduced. On the other hand, if it exceeds 20n moles, the amount of free formaldehyde in the resulting resin increases undesirably. The especially preferred amount of formaldehyde is $2n \pm 1$ moles.

In addition to formaldehyde, there may be conjointly used known formaldehyde-yielding substances or aldehydes such as acetaldehyde, propionaldehyde, glyoxal, succinic aldehyde and chloral.

Typical examples of the polyol include ethylene glycol, diethylene glycol, polyethylene glycol having a number average molecular weight of 150 to 2,000, propylene glycol, dipropylene glycol, polypropylene glycol having a number average molecular weight of 192 to 2,000, butanediol, pentanediol, neopentyl glycol, hexanediol, 2,2,4-trimethyl-1,3-pentanediol, trimethylolethane, trimethylolpropane, pentaerythritol, dipentaerythritol, glycerol and sorbitol; bisphenols; hydrogenated bisphenols; halogenated bisphenols; addition products between these polyhydric alcohols or bisphenols and alkylene oxides; and polyesters having a number average molecular weight of 204 to 4,000 obtained by the reaction of the above polyols with polybasic acids.

Other polyols which can also be used in this invention are hydroxyl-containing fatty acid ester polyols having a number average molecular weight of 341 to 4,000 such as alcoholysis reaction products between the aforesaid polyols and oils and fats, esterification reaction products having a number average molecular weight of 389 to 4,000 between higher fatty acids and the aforesaid polyols or epoxy compounds having a number average molecular weight of 174 to 4,000, and castor oil.

These polyols are used singly or in combination.

As required, these polyols may be used in combination with monohydric alcohols. Typical examples of the monohydric alcohols include aliphatic alcohols such as methyl, ethyl, propyl, butyl, amyl and octyl alcohols; alicyclic alcohols such as cyclohexyl alcohol; aromatic alcohols such as benzyl alcohol; and ether alcohols such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether and tetrahydrofurfuryl alcohol.

The triazine-type resin (A) as a first component of the composition of this invention is obtained by co-condensing the triazine-type amino compound, formaldehyde and the polyol and as required a monohydric alcohol. It is achieved, for example, by (1) a method in which alkoxymethylated triazine-type amino compound having a number average molecular weight of 185 to 642 is used as a starting material, and (2) a method which comprises simultaneously reacting the triazine-type amino compound, the aldehyde and the polyol and optionally the monohydric alcohol.

The alkoxymethylated triazine-type amino compound is represented by the general formula

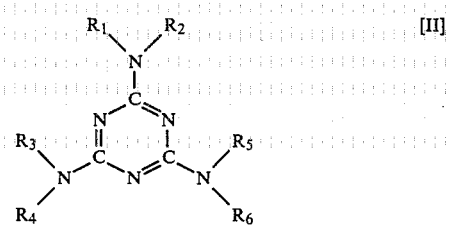

wherein each of $R_1$, $R_2$, $R_3$, $R_4$, $R_5$ and $R_6$ represents —H, —CH$_2$OH or —CH$_2$OR in which R represents an aliphatic, alicyclic or aromatic monohydric alcohol residue or an ether alcohol residue, or the general formula

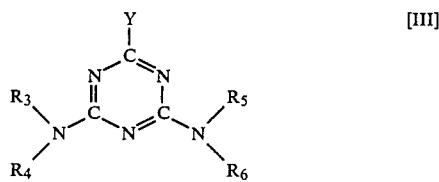

wherein Y represents hydrogen, methyl, ethyl, propyl, or phenyl, and each of $R_3$, $R_4$, $R_5$ and $R_6$ represents —H, —CH$_2$OH or —CH$_2$OR.

In these two general formulae, at least one of $R_1$, $R_2$, $R_3$, $R_4$, $R_5$ and $R_6$ bonded to the nitrogen atoms should be an alkoxymethyl group, and in this context, $R_1$ to $R_6$ may partly contain a methylol group. Of course, all of the groups $R_1$ to $R_6$ may be alkoxymethyl groups. Typical examples of the alkoxy group are methoxy, ethoxy and butoxy groups.

The compounds represented by formula [II] or [III] need not always to be single substances, and may be polymerized through methylene linkages or dimethylene ether linkages.

Preferably, the alkoxymethylated triazine-type amino compound has at least three alkoxymethyl groups per triazine ring, and hexamethoxymethylmelaine is especially preferred.

The reaction of the alkoxymethylated triazine-type amino compound with the polyol is carried out in the presence or absence of a catalyst without a solvent or in the presence of as non-reactive solvent.

Examples of the catalyst which may be used include known Lewis acids; mineral acids such as hydrochloric acid, sulfuric acid or phosphoric acid; organic acids or their esters, such as formic acid, oxalic acid, monoalkyl esters of maleic anhydride, monoalkyl esters of phthalic anhydride, phenylsulfonic acid, p-toluenesulfonic acid, tetrachloroacetic acid, monoalkyl esters of tetrachlorophthalic anhydride; and metal alcoholates such as sodium methylate.

The non-reactive solvent denotes a solvent which dissolves the reactants but does not inhibit the alcohol exchange reaction. Typical examples include aromatic hydrocarbons (e.g., benzene, toluene or xylene), esters, ethers and ketones.

Preferably, the alcohol exchange reaction is carried out at a temperature of 50° to 180° C., preferably 80° to 150° C., under atmospheric or reduced pressure while eliminating the alcohol, and completed in 1 to 20 hours, although these reaction conditions may vary depending upon whether the catalyst is used or not.

When a strongly acidic catalyst is used or the reaction temperature exceeds 180° C., the self-condensation of the alkoxymethylated triazine-type amino compound is accelerated. Hence, such reaction conditions are not general.

The method (2) mentioned above may be said to be a one-step version of the method (1) using the alkoxymethylated triazine-type amino compound as a starting material, and has the advantage that the cost is low because no intermediate is used, and the polyhydric alcohol having a number average molecular weight of 136 to 4,000, such as pentaerythritol or dipentaerythritol, which forms a heterogeneous phase in an organic solvent becomes a homogeneous phase in formalin. On the other hand, the method (2) has the defect that the unreacted formaldehyde tends to remain in the desired solution of the resin (A), and the degree of condensation of the resin (A) tends to increase relatively easily.

The method (2) may be carried out by adding some water to a mixture of the aforesaid starting materials, adjusting the pH of the mixture to 7–9.5, reacting it at a temperature of 50° to 100° C. for 20 to 180 minutes, adding an acid catalyst, lowering the pH of the reaction mixture to 3–7, and reacting it further at 80° to 150° C. while distilling the solvent or diluent present in the reaction system together with water; or by omitting the methylolating step, and directly adjusting the pH of the mixture to 314 7, and performing the methylolation and etherification simultaneously at 80° to 150° C. By either of these embodiments, the triazine-type resin (A) used in this invention can be obtained.

Formaldehyde is used in the form of formalin or paraformaldehyde. When paraformaldehyde is used and it contains 20% of water, it is not always necessary to add water to the reaction system. With paraformaldehyde having a higher purity, the addition of water may be necessary depending upon the reaction conditions.

In the method (2), the polyol may be fed all at a time, or in divided portions, or in the latter half of the alkyl etherification, depending upon its functionality or solubilty in the system.

In the case of the method (2) involving adding all the materials at a time, methanol, ethanol, isopropanol or butanol is generally used also as a solvent. It is presumed that the reaction according to this method takes place in accordance with the following schemes (a) and (b) (in which T represents the triazine ring).

(a): T—NH$_2$ + CH$_2$O + CH$_3$OH ⟶

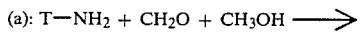
T—NHCH$_2$OCH$_3$ + H$_2$O

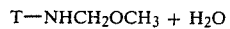
(b): T—NHCH$_2$OCH$_3$ + CH$_3$—CH$_2$—C—CH$_2$OH ⟶

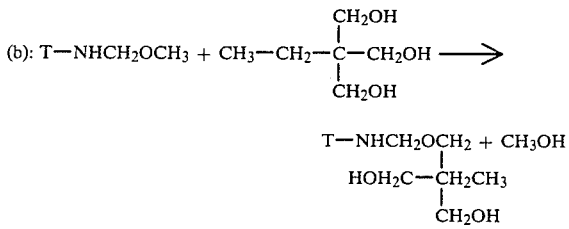

Accordingly, the removal of water and methanol from the reaction system becomes a rate determining step for carrying out the reaction.

For the aforesaid pH adjustment, known acid catalysts used generally for preparation of melamine resins, for example organic weak acids such as formic acid, acetic acid, oxalic acid or maleic anhydride or inorganic weak acids such as phosphoric acid and polyphosphoric acid, are used. There can also be used an organic amine such as triethylamine and diethanolamine or an inorganic base such as sodium hydroxide, potassium hydroxide and ammonia.

The reaction proceeds by the removal of water and the alcohol. In order to accelerate the removal of such substances and consequently promote the reaction, the aforesaid hydrocarbon solvents may be used as entrainers.

Whether the method (1) involving using the alkoxymethylated triazine-type amino compound as a starting material or the method (2) involving adding all the materials at a time is employed, the solvent used should be replaced by a solvent non-reactive with the polyisocyanate (B). The aforesaid aromatic hydrocarbons, esters, ketones and ethers are used as such a solvent. Above all, toluene, xylene or a mixture of toluene or xylene with ethyl acetate or butyl acetate is preferred.

Suitable triazine-type resins (A) described above have a number average molecular weight of 215 to 10,000.

Typical examples of the polyisocyanate (B) as a second component of the composition of this invention include alkylene diisocyanates such as 1,6-hexamethylene diisocyanate, 1,2-octamethylene diisocyanate, 1,2-dodecamethylene diisocyanate and 2,2,4-triemthylhexamethylene diisocyanate; cycloalkylene diisocyanates such as 3-isocyanatomethyl-3,5,5-trimethylcyclohexyl isocyanate, cyclopentylene-1,3-diisocyanate, cyclohexylene-1,4-diisocyanate and 4-methyl-1,3-diisocyanatocyclohexane; unsaturated diisocyanates such as bis(2-isocyanatoethyl)fumarate and transvinylene diisocyanate; aliphatic or alicyclic diisocyanates such as 3,3'-diisocyanatodipropyl ether, methyl2,6-diisocyanatocaproate, 4,4'-methylenebis(cyclohexyl isocyanate), methane diisocyanate, N,N',N'-tris(6-isocyanatohexamethyl)biuret and bis(2-isocyanatoethyl) carbonate; and aromatic diisocyanates such as tolylene diisocyanate, xylylene diisocyanate, dianisidine diisocyanate, 4,4'-diphenylmethane diisocyanate, 1-ethoxy-2,4-diisocyanate, 1-chloro-2,4-diisocyanatobenzene, tris(4-isocyanatophenyl)methane, naphthalene diisocyanate, fluorene diisocyanate, 4,4'biphenyl isocyanate, phenylene diisocyanate, 3,3'-dimethyl 4,4'-biphenyl diisocyanate, p-isocyanatobenzyl isocyanate and tetrachloro-1,3-phenylene diisocyanate. They may be used either singly or in combination. There can also be used isocyanato-terminated prepolymers obtained by the reaction of the aforesaid diisocyanates with polyhydroxy compounds having a number average molecular weight of 62 to 2,000 or polyamine compounds having a number average molecular weight of 60 to 116.

Typical examples of such low-molecular-weight polyhydroxy compounds include ethylene glycol, propylene glycol, diethylene glycol, dipropylene glycol, polyethylene glycol having a number average molecular weight of 150 to 2,000, polypropylene glycol having a number average molecular weight of 192 to 2,000, 1,4-butanediol, hexamethylene glycol, neopentyl glycol, polyester polyols having a number average molecular weight of 204 to 2,000 such as polyethylene adipate glycol having a numer average molecular weight of 238 to 2,000 and polybutylene adipate glycol having a number average molecular weight of 290 to 2,000; and glycerol, trimethylolpropane and pentaerythritol.

Typical low-molecular-weight polyamine compounds include ethylenediamine, propylenediamine and hexamethylenediamine.

Polyisocyanates containing an isocyanuric ring obtained by polymerizing the polyisocyanates in the presence of a polymerization catalyst such as a metal catalyst or a quaternary ammonium salt, or biuret-type polyisocyanates obtained by converting the aforesaid polyisocyanates into a biuret form using water.

The polyisocyanates (B) described above suitably have a number average molecular weight of 168 to 2,000.

The coating resin composition of this invention comprises the triazine-type resin (A) and the polyisocyanate (B) as essential components, and is prepared by mixing them so that the solids weight ratio of (A) to (B) becomes from 5:95 to 95:5. Since the isocyanate groups in the polyisocyanate (B) react with the amino groups, imino group, methylol group and/or hydroxyl group in the triazine-type resin (A) to form a coated film having a three-dimensional network structure, the mixing ratio of (A) to (B) can be changed freely within the above-specified range according to the functionality of these components or the desired purpose and use.

If the proportion of the polyisocyanate (B) is less than 5% by weight, the crosslinking density of the resulting coated film becomes too low, and sufficient film properties cannot be obtained. If the proportion of the triazine-type resin (A) is less than 5% by weight, it is difficult to obtain a composition having the properties suited for the object of this invention. Especially preferably, the proportion of the polyisocyanate (B) is adjusted to 20 to 50% by weight.

The resulting composition of this invention can be used either as a clear paint or an enamel paint. The method of forming paints, and the pigments, coating aids and curing catalysts used may be the same as those in conventional urethane paints.

The coating resin composition of this invention gives a coated film having good gloss, fullness, pigment dispersibility and durability and has good application property. In addition, it can have a high solids content of the vehicle resin component. Accordingly, it is useful for painting woodworks or furniture and refinishing automobiles or also as an anticorrosive paint or a paint for plastics.

The following Referential Examples, Examples and Comparative Examples illustrate the present invention. All percentages, parts and ratios in these examples are by weight unless otherwise indicated.

REFERENTIAL EXAMPLE 1

A reactor equipped with a thermometer, a stirrer and a solvent removing device (comprised of a bifurcated linking tube and a Liebig condenser and a collector linked to it) was charged with 420 parts of "Cymel 300" (a trade name for hexamethoxymethylolmelamine produced by Mitsui Toatsu Chemicals, Inc.), 361 parts of trimethylolpropane and 149 parts of xylene. They were heated to 50° C., and stirring of the mixture was started. The temperature of the mixture was then raised to 120° C. over the course of 1 hour to perform alcohol exchange. The reaction was continued while collecting the resulting gaseous mixture of methanol and xylene by cooling.

The reaction mixture was gradually heated so that its temperature finally became 130° C. When a period of 15 hours passed, the reaction mixture had a nonvolatile content (NV) of 84.0% and a Gardner viscosity (the viscosities appearing hereinafter are all Gardner viscosities) at 25° C. of $Z_6$. The amount of the mixed solvent containing methanol which had been distilled up to this time was 100 parts.

To the resulting resin solution were added 17 parts of xylene and 150 parts of ethyl Cellosolve acetate to obtain 1,000 parts of a solution of a triazine-type resin (A) having an NV of 70.0% and a viscosity of V-W. This resin will be abbreviated as resin (A-1) hereinafter.

REFERENTIAL EXAMPLE 2

The same reactor as used in Referential Example 1 was charged with 474 parts of "Cymel 300", 54 parts of trimethylolpropane, 284 parts of 1,6-hexanediol and 138 parts of toluene, and they were heated to 50° C. Stirring of the mixture was started, and its temperature was then raised to 110° C. over the course of 1 hour to perform alcohol exchange. The reaction was carried out while collecting the resulting gaseous mixture of metahnol and toluene by cooling.

The reaction mixture was gradually heated so that it finally attained a temperature of 150° C. When a period of 15 hours passed, the reaction product had an NV of 84.1% and a viscosity of $Z_5$-$Z_6$. The amount of the mixed solvent containing methanol which had been distilled up to this time was 95 parts.

To the reaction product were added 30 parts of toluene and 150 parts of ethyl acetate to form 1,000 parts of a solution of a triazine-type resin (A) having an NV of 69.5% and a viscosity of W-X. This resin will be abbreviated as resin (A-2) hereinafter.

REFERENTIAL EXAMPLE 3

The same reactor as used in Referential Example 1 was charged with 541 parts of "Cymel 300" and 253 parts of glycerol, and the temperature of the mixture was raised to 50° C. Stirring was started, and the temperature was raised to 110° C. over the course of 1 hour to perform alcohol exchange. The reaction was carried out while collectingthe resulting methanol by cooling. Furthermore, 1 part of 80% solution of formic acid was added as a catalyst to facilitate the reaction.

The reaction mixture was gradually heated so that it finally attained a temperature of 120° C. When a period of 15 hours passed, the amount of the mixed solvent containing methanol which had been distilled up to that time was 85 parts.

Then, 300 parts of ethyl Cellosolve acetate was added to the resulting solution of the reaction product to obtain 1,000 parts of a solution of a triazine-type resin (A) having an NV of 71.0% and a viscosity of V-W. This resin will be abbreviated as resin (A-3) hereinafter.

REFERENTIAL EXAMPLE 4

The same reactor as used in Referential Example 1 was charged with 542 parts of "Cymel 300" and 268 parts of propylene glycol. The reaction mixture was heated to 50° C., and its stirring was started. The temperature was raised to 110° C. over the course of 1 hour to perform alcohol exchange. The reaction was performed while collecting the resulting methanol by cooling. To facilitate the reaction, 1 part of an 80% aqueous solution of formic acid was added as a catalyst. Then, the reaction mixture was heated so that it finally attained a temperature of 130° C., and the reaction was continued for 15 hours. The amount of the materials collected including methanol was 100 parts.

Toluene and ethyl acetate each in an amount of 150 parts were added to the resulting reaction product to obtain 1,000 parts of a solution of a triazine-type resin (A) having an NV of 69.8% and a viscosity of H. The resin will be abbreviated as resin (A-4) hereinafter.

REFERENTIAL EXAMPLE 5

A reactor equipped with a thermometer, a stirrer, a nitrogen gas introducing device and an air cooling tube was charged with 431 parts of soybean oil, 92 parts of glycerol and 0.1 part of lithium hydroxide. While nitrogen gas was blown into the reactor, the temperature was raised to 230° C. The reaction mixture was maintained at this temperature for 3 hours to give a pale yellow transpasent alcoholysis reaction product (i.e. hydroxyl-containing ester polyol).

The same reactor as used in Referential Example 1 was charged with 230 parts of "Cymel 300" and 517 parts of the hydroxyl-containing ester polyol. The mixture was heated to 50° C., and its stirring was started. Thereafter, it was heated to 110° C. over the course of 1 hour to perform alcohol exchange. The reaction was carried out while collecting the resulting methanol by cooling. To facilitate the reaction, 1 part of an 80 % aqueous solution of formic acid was added. The mixture was gradually heated for 15 hours until the final temperature reached 140° C. The amount of the materials collected including methanol was 40 parts.

Then, toluene and ethyl acetate each in an amount of 150 parts were added to the resulting solution of the reaction product to give a solution of a triazine-type resin (A) having an NV of 70.0% and a viscosity of F-G. This resin will be abbreviated as resin (A-5) hereinafter.

REFERENTIAL EXAMPLE 6

A hydroxy-containing ester polyol as an alcoholysis reaction product was obtained in the same way as in Referential Example 5 except that 483 parts of soybean oil, 76 parts of pentaerythritol and 0.1 part of lithium hydroxide were used as starting materials.

Then, the same procedure as in Referential Example 5 was taken except that the amounts of the "Cymel 300" and the hydroxyl-containing ester polyol were changed to 175 parts and 559 parts, respectively, and the final temperature reached was changed to 130° C. The amount of the materials collected including methanol was 30 parts.

At this time, toluene and ethyl acetate each in an amount of 150 parts were added to the resulting solution of the reaction product to give 1,000 parts of a solution of a triazine-type resin (A) having an NV of 70.0% and a viscosity of G-H. The resin will be abbreviated as resin (A-6).

REFERENTIAL EXAMPLE 7

The same reactor as used in Referential Example 1 was charged with 211 parts of "Cymel 300" and 534 parts of "Hyprox RT-400" (a trade name for polypropylene glycol produced by Dainippon Ink and Chemicals, Inc.). The mixture was heated to 50° C., and its stirring was started. Then, the temperature was raised to 120° C. over the course of 1 hour to perform alcohol exchange. The reaction was carried out while collecting the resulting methanol by cooling. One part of an 80% aqueous solution of formic acid was added as a catalyst. The mixture was heated gradually so that it finally attained a temperature of 140° C. After a lapse of 15 hours, the amount of the materials collected including methanol was 40 parts.

Toluene and ethyl acetate each in an amount of 150 parts were added to the resulting solution of the reaction product to give 1,000 parts of a solution of a triazine-type resin (A) having an NV of 70.0% and a viscosity of M-N. The resin will be abbreviated as resin (A-7) hereinafter.

REFERENTAIL EXAMPLE 8

The same reactor as used in Referential Example 1 was charged with 94 parts of "Cymel 300" and 621 parts of "NISSO-PB G-1000" (a trade name for polybutadiene glycol made by Nippon Soda Co., Ltd.). The mixture was heated to 50° C., and its stirring was started. The temperature was then raised to 110° C. over the course of 1 hour to perform alcohol exchange. The reaction was carried out while collecting the resulting methanol by cooling. One part of an 80% aqueous solution of formic acid was added as a catalyst. The mixture was gradually heated until it finally attained a temperature of 130° C. over the course of 15 hours. The amount of the materials collected including methanol was 10 parts.

Toluene and ethyl acetate each in an amount of 150 parts were added to the resulting solution of the reaction product to obtain 1,000 parts of a solution of a triazine-type resin (A) having an NV of 69.5% and a viscosity of K-J. The resin will be abbreviated as resin (A-8).

REFERENTIAL EXAMPLE 9

The same reactor as used in Referential Example 1 was charged with 268 parts of "Cymel 300" and 481 parts of "Newcol BA-P2 Glycol" (a trade name for a bisphenol A/propylene oxide adduct made by Nippon Nyukazai Co., Ltd.). The temperature was raised to 50° C. and the stirring of the mixture was started. The temperature was further raised to 110° C. over the course of 1 hour to perform alcohol exchange. The reaction was carried out while collecting the resulting methanol by cooling. One part of an 80% aqueous solution formic acid was further added as a catalyst. The mixture was gradually heated for 15 hours until it finally attained a temperature of 140° C. The amount of the materials collected up to this time including methanol was 40 parts.

Toluene and ethyl acetate each in an amount of 150 parts were added to the resulting solution of the reaction product to form 1,000 parts of a solution of a triazine-type resin (A) having an NV of 69.8% and a viscosity of P-Q. The resin will be abbreviated as resin (A-9).

REFERENTIAL EXAMPLE 10

A reactor equipped with a thermometer, a stirrer and a reflux condenser was charged with 144 parts of melamine, 256 parts of 80% paraformaldehyde and 219 parts of methanol. The mixture was heated to 40° C., and its stirring was started. The pH of the mixture was raised by adding 0.5 part of a 16% aqueous solution of NaOH. The solution was further heated to 70° C. and maintained at this temperature for 1 hour to prepare methylolated melamine.

Then, the temperature was lowered to 50° C., and 0.8 part of 80% formic acid was added. The pH was decreased to 5.5, and the temperature of raised to 70° C. The reaction mixture was maintained at this temperature for 2 hours to methoxylate it partly.

Then, 382 parts of trimethylolpropane was added, and the mixture was maintained at 60° C. for 3 hours to cocondense trimethylolpropane and methanol to give a methanol solution of the hydroxyl-containing triazine-type resin (A) having an NV of 70% and a viscosity of $H-I^2$ and containing water of condensation.

The resin was neutralized by adding 1.0 part of aminomethylpropanol. The reflux condenser was removed at this time, and to enable solvent elimination under reduced pressure, a Liebig condenser, a pressure reduction adapter and a collector were connected to one portion of a bifurcated tube. Methanol and water were distilled under reduced pressure at 700 mmHg and 40° –45° C. Methanol and water were further removed and to complete the reaction, 133 parts of xylene was added. The pressure was returned to atmospheric pressure, and the temperature was raised to 120° C. The remaining methanol and water were distilled together with xylene. When the amount of the distillates reached 86 parts, the solution of the reaction product had an NV of 84.5% and a viscosity of $I_6-Z_7$.

To the resulting solution of the reaction product were added 17 parts of xylene and 150 parts of ethyl Cellosolve acetate to give 1,000 parts of a solution of a triazine-type resin (A) having an NV of 70% and a viscosity of W. The resin will be abbreviated as resin (A-10).

REFERENTIAL EXAMPLE 11

Methylolated benzoguanamine was prepared and cocondensed in the same way as in Referential Example 10 except that 144 parts of benzoguanamine was used instead of melamine, the amount of 80% paraformaldehyde was changed to 164 parts, the amount of methanol was changed to 370 parts, the amount of the 16% aqueous solution of NaOH was changed to 0.2 part, and the amount of trimethylolpropane was changed to 311 parts. Thus, a methanol solution of a hydroxyl-containing triazine-type resin (A) having an NV of 65% and a viscosity fo A-B² and containing water of condensation.

Subsequently, the same procedure as in Referential Example 10 was taken except that the amount of aminomethylpropanol was changed to 0.5 part. Thus, 1000 parts of a solution of a triazine-type resin (A) having an NV of 70% and a viscosity of P-Q was obtained. The resin will be abbreviated as resin (A-11) hereinafter.

REFERENTIAL EXAMPLE 12

The same reactor as used in Referential Example 10 was charged with 184 parts of acetoguanamine, 249 parts of 80% paraformaldehyde, 21 parts of water and 330 parts of methanol. The mixture was heated to 40° C., and its stirring was started. Then, 0.6 part of a 16% aqueous solution of NaOH was added and the pH of the solution was increased. The mixture was heated to 70° C. and maintained at this temperature for 4 hours to prepare methylolated acetoguanamine.

The product was then cooled to 50° C., and 20 parts of a mixture of 85% aqueous phosphoric acid solution and water in a weight ratio of 1:2 was added to lower the pH to 4.6. Again, the mixture was maintained at 70° C. for 2 hours to methoxylate it partly.

Then, 316 parts of trimethylolpropane was added, and the mixture was maintained at 60° C. for 3 hours to co-condense the methyloylated reaction product with trimethylolpropane and methanol to give a methanol solution of a hydroxyl-containing triazine-type resin (A) having an NV of 60% and viscosity of A²-B and containing water of condensation.

Subsequently, the same procedure as in Referential Example 10 was repeated except that 10 parts of a 20% aqueous solution of NaOH was used as an alkali for neutralization. There was obtained 1,000 parts of a solution of a triazine-type resiln (A) having an NV of 70.1% and a viscosity of R-S. The resin will be referred to as resin (A-12).

EXAMPLES 1 TO 12 AND COMPARATIVE EXAMPLES 1 TO 3

In each run, a coating composition was prepared by mixing each of the triazine-type resins obtained in Referential Examples 1 to 12 as a base and "Burnock D-750" (a trade name for a polyisocyanate manufactured by Dainippon Ink and Chemicals, Inc.) as the polyisocyanate (B) so that the equivalent ratio of the hydroxyl group in the triazine-type resin to the isocyanate groups in the curing agent was 1:1, and adding ethyl Cellosolve acetate as a diluent. The coating composition was brush-coated on a natural wooden fancy plywood to form a coated film.

For comparison, "Beckosol 1308" (a trade name for a short-oil alkyd resin manufactured by Dainippon Ink and Chemicals, Inc.; oil length=44, NV=50%), "Beckosol 13-438-60" (a trade name for a short-oil alkyd resin manufactured by the same company; oil length=33, NV=60%) and "Acrydic A-801" (a tradename for an acrylic polyol resin manufactured by the same company) as the base. These comparative base resins will be referred to as resin (A'-1), resin (A'-2) and resin (A'-3), respectively. In each of the Comparative Examples, the same procedure as above was repeated except that each of these comparative base resins was used instead of the triazine-type resin obtained in Referential Examples 1 to 12.

The properties of the coating compositions and the resulting coated films in these Examples and Comparative Examples are examined, and the results are summarized in Tables 1 to 3.

The testing methods were as follows:

Dryinq property

Both set to touch (unit=minutes) and dry through (unit=hours) were determined in accordance with JIS K-5400.

Pencil hardness

Carried out in accordance with JIS K-5400.

Gloss

The coating resin composition was brush-coated and dried. The 60° specular gloss value of the dried coated film was measured.

Weatherability

The dried coated film was exposed to Sunshine Weather-Ometer for 100 hours (accelerated weatherability test), and the gloss of the exposed film was determined.

Yellowinq resistance

The degree of yellowing after the weatherabilty test described above.

Solvent resistance

The dried coated film was subjected to 50 rubbing with ethyl acetate, and then the change of the coated surface was evaluated by visual observation.

Fullness

The fullness of the dried coated film was evaluated by visual observation.

Ability to attain a hiqh solids content

NV (%) of a coating composition. All sample coating compositions were prepared in the same viscosity.

Humid and thermal resistance test

Carried out in accordance with Japanese Agricultural Standards (JAS) on special plywoods.

Thermo-cycle test

Same as the humid and thermal resistance test.

Pot life

The pot life value (unit=hours) of a coating composition. All sample coating compositions were prepared in the same viscosity. The fullness, solvent resistance, humid and thermal resistance test and thermo-cycle test were evaluated on the following standards.

◎: Excellent
○: Good
Δ: Fair
×: Poor
××: Became useless

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Base resin | A-1 | A-2 | A-3 | A-4 | A-5 | A'-1 | A'-2 | A'-3 |
| Set to touch | 14 | 10 | 10 | 10 | 14 | 13 | 13 | 10 |
| Dry through | 2:40 | 2:30 | 2:30 | 2:30 | 3:00 | 3:00 | 3:00 | 2:30 |
| Gloss | 97.0 | 95.8 | 96.0 | 95.4 | 96.5 | 91.0 | 90.5 | 90.0 |

TABLE 1-continued

|  | Examples | | | | | Comparative Examples | | |
|---|---|---|---|---|---|---|---|---|
|  | 1 | 2 | 3 | 4 | 5 | 1 | 2 | 3 |
| Fullness |  |  | ◎ |  |  | ○ | ○-△ | △-X |
| Ability to attain high solids | 53.0 | 53.5 | 53.1 | 56.0 | 56.5 | 45.0 | 47.2 | 40.0 |
| Pencil hardness | 2H-H | 2H-H | 2H-H | H-HB | HB | HB | F | H |
| Solvent resistance |  |  | ○ |  |  |  | ○ |  |
| Weatherability | 90.0 | 89.5 | 89.0 | 90.0 | 90.0 | 83.0 | 60.5 | 88.0 |
| Yellowing resistance | 0.4 | 0.2 | 0.5 | 0.4 | 1.5 | 3.5 | 17.0 | 0.2 |
| Humid and thermal resistance | ◎ | ◎ | ◎ | ◎-○ | ○ | ○ | ○ |  |
| Thermo-cycle test |  |  | ◎ |  |  |  |  | △ |
| Pot life | 7:00 | 8:00 | 6:30 | 6:30 | 7:00 | 5:00 | 4:30 | 4:00 |

(Note):
"2:40" or "7:00" in the "dry through" and "pot life" means "2 hours and forty minutes" or "seven hours". (This applies also to Tables 2 and 3.)

TABLE 2

|  | Examples | | | | Comparative Examples | | |
|---|---|---|---|---|---|---|---|
|  | 6 | 7 | 8 | 9 | 1 | 2 | 3 |
| Base resin | A-6 | A-7 | A-8 | A-9 | A'-1 | A'-2 | A'-3 |
| Set to touch | 14 | 12 | 12 | 12 | 13 | 13 | 10 |
| Dry through | 3:00 | 2:30 | 2:40 | 3:00 | 3:00 | 3:00 | 2:30 |
| Gloss | 96.4 | 97.0 | 95.3 | 98.0 | 91.0 | 90.5 | 90.0 |
| Fullness |  | ◎ |  |  | ○ | ○-△ | △-X |
| Ability to attain high solids | 56.0 | 54.0 | 55.0 | 54.0 | 45.0 | 47.2 | 40.0 |
| Pencil hardness | HB | 2H-H | H-HB | HB | HB | F | H |
| Solvent resistance | ◎ | ◎ | ◎-○ | ◎-○ |  | ○ |  |
| Weatherability | 90.1 | 90.4 | 88.0 | 91.0 | 83.0 | 60.5 | 88.0 |
| Yellowing resistance | 1.4 | 0.4 | 2.5 | 0.2 | 3.5 | 17.0 | 0.2 |
| Humid and thermal resistance |  |  | ◎ |  |  | ○ |  |
| Thermo-cycle test |  |  | ◎ |  | ○ | ○ | △ |
| Pot life | 7:00 | 7:30 | 8:00 | 9:00 | 5:00 | 4:30 | 4:00 |

TABLE 3

|  | Examples | | | Comparative Examples | | |
|---|---|---|---|---|---|---|
|  | 10 | 11 | 12 | 1 | 2 | 3 |
| Base resin | A-10 | A-11 | A-12 | A'-1 | A'-2 | A'-3 |
| Set to touch | 12 | 11 | 11 | 13 | 13 | 10 |
| Dry through | 2:40 | 2:30 | 2:30 | 3:00 | 3:00 | 2:30 |
| Gloss | 93.0 | 98.0 | 98.0 | 91.0 | 90.5 | 90.0 |
| Fullness | ◎-○ | ◎ | ◎ | ○ | ○-△ | △-X |
| Ability to attain high solids | 51.0 | 53.5 | 55.0 | 45.0 | 47.2 | 40.0 |
| Pencil hardness | 2H-H | H | H | HB | F | H |
| Solvent resistance | ○ | ○-○ | ○ |  | ○ |  |
| Weatherability | 89.1 | 70.0 | 93.0 | 83.0 | 60.5 | 88.0 |
| Yellowing resistance | 0.5 | 5.0 | 0.2 | 3.5 | 17.0 | 0.2 |
| Humid and thermal resistance | ◎-○ | ◎ | ◎ | ○ |  |  |
| Thermo-cycle test |  | ◎ |  | ○ | ○ | △ |
| Pot life | 5:30 | 7:00 | 7:30 | 5:00 | 4:30 | 4:00 |

What we claim is:

1. A coating resin composition consisting essentially of
(A) a triazine-type resin obtained by co-condensing a triazine-type amino compound represented by the general formula

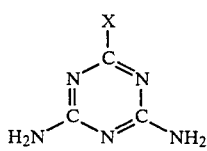

wherein X is hydrogen, methyl, ethyl, propyl, phenyl or amino, formaldehyde and a polyol and as required, a monohydric alcohol, and (B) a polyisocyanate,
the solids weight ratio of (A) to (B) being from 5:95 to 95:5.

2. The composition of claim 1 wherein the triazine-type resin has a number average molecular weight of 215 to 10,000.

3. The composition of claim 1 wherein the triazine-type resin (A) is obtained by using an alkoxymethylated triazine-type amino compound.

4. The composition of claim 1 wherein the triazine-type resin (A) is obtained by using an alkoxymethylated triazine-type amino compound having a number average molecular weight of 185 to 642.

5. The composition of claim 1 wherein the polyisocyanate (B) has a number average molecular weight of 168 to 2,000.

* * * * *